United States Patent [19]

Dickson

[11] 3,856,504

[45] Dec. 24, 1974

[54] USE OF CERTAIN N-(2,6-DIHALOBENZYLIDENE)-BENZYLAMINES AND CERTAIN N-(2,6-DIHALOBENZYLIDENE)PHENYLETHYLAMINES TO INCREASE CROP YIELD

[75] Inventor: Thomas K. Dickson, Greenville, Miss.

[73] Assignee: Hercules Incorporated, Wilmington, Del.

[22] Filed: June 8, 1971

[21] Appl. No.: 151,151

[52] U.S. Cl. ................................. 71/121
[51] Int. Cl. ............................. A01n 9/20
[58] Field of Search ............... 71/121; 260/566 F

[56] References Cited
UNITED STATES PATENTS

| | | | |
|---|---|---|---|
| 3,253,022 | 5/1966 | Linder et al. | 260/518 |
| 3,279,907 | 10/1966 | Linder et al. | 71/121 |
| 3,466,164 | 9/1969 | De Gaetano | 71/121 |
| 3,637,851 | 1/1972 | Rumanoski | 260/566 F |

Primary Examiner—Lewis Gotts
Assistant Examiner—Catherine L. Mills
Attorney, Agent, or Firm—George H. Hopkins

[57] ABSTRACT

Disclosed is the use of certain N-(2,6-dihalobenzylidene)benzylamines and certain N-(2,6-Dihalobenzylidene)phenylethylamines to increase the yield of crops. These compounds have the formula:

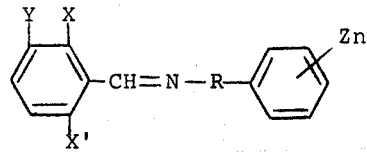

in which R is selected from the group consisting of $CH_2$, $CH(CH_3)$, $C(CH_3)_2$ and $CH_2-CH_2$, Z is selected from the group consisting of X'' and $CH_3$, n is selected from the group consisting of 0, 1 and 2, X, X' and X'' are selected from the group consisting of F, Cl, Br and I, and Y is selected from the group consisting of H and $NO_2$.

3 Claims, No Drawings

USE OF CERTAIN N-(2,6-DIHALOBENZYLIDENE)-BENZYLAMINES AND CERTAIN N-(2,6-DIHALOBENZYLIDENE)PHENYLETHYLAMINES TO INCREASE CROP YIELD

This invention is in the chemical arts. It pertains to that part of chemistry having to do with the regulation of plant growth.

In summary, this invention provides a process and a composition for increasing the yield of crops.

The process aspect comprises applying to the growing plants of a crop a quantity effective to increase the yield of said crop of material (hereinafter referred to as growth effect material) selected from the group of compounds represented by the generic structural formula I:

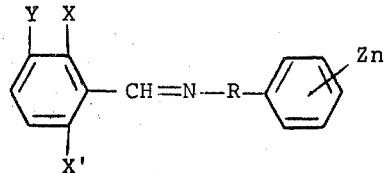

in which R is selected from the group consisting of $CH_2$, $CH(CH_3)$, $C(CH_3)_2$ and $CH_2-CH_2$, Z is selected from the group consisting of X'' and $CH_3$, n is selected from the group consisting of 0, 1 and 2. X, X' and X'' are selected from the group consisting of F, Cl, Br and I, and Y is selected from the group consisting of H and $NO_2$. Examples of the compounds of the formula include:

N-(2,6-dichlorobenzylidene)-α,α-dimethylbenzyl amine
N-(2,6-dichlorobenzylidene)-α,α-3,4-tetramethylbenzyl amine
N-(2,6-dichlorobenzylidene)-α-methylbenzyl amine
N-(2,6-dichlorobenzylidene)benzyl amine
N-(2,6-dichlorobenzylidene)-α,α-dimethyl-p-chlorobenzyl amine
N-(2,6-dichlorobenzylidene)-α,α-dimethyl-p-bromobenzyl amine
N-(2-chloro-6-fluorobenzylidene)-α,α-dimethylbenzyl amine
N-(2-chloro-6-fluorobenzylidene)-α,α-3,4-tetramethylbenzyl amine
N-(2,6-dichloro-5-nitrobenzylidene) -α,α-dimethylbenzyl amine
N-(2,6-dichloro-5-nitrobenzylidene)-2,4-dichlorobenzyl amine
N-(2,6-dichloro-5-nitrobenzylidene)benzyl amine
N-(2,6-dichloro-5-nitrobenzylidene)-2,4-dichlorobenzyl amine
N-(2,6-dichloro-5-nitrobenzylidene) α-methylbenzyl amine
N-(2,6-dichlorobenzylidene)-o-chlorobenzyl amine
N-(2,6-dichlorobenzylidene)-p-chlorobenzyl amine
N-(2,6-dichlorobenzylidene)-2,4-dichlorobenzyl amine
N-(2,6-dichlorobenzylidene)-3,4-dimethylbenzyl amine
N-(2,6-dichlorobenzylidene)-p-methylbenzyl amine
N-(2,6-dichlorobenzylidene)-2-phenylethyl amine The compounds represented by the formula in general are viscous yellow to red liquids at 20°–25°C. A few of the compounds are solid at 20°–25°C. In general the compounds are substantially insoluble in water and substantially soluble in acetone and benzene.

The compounds are made by reacting a benzaldehyde of the formula:

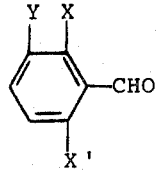

with a benzyl amine of the formula:

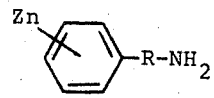

In these formulas, R, X, X', Y, Z and n are defined as in formula I. Many of the benzaldehydes and benzyl amines of the foregoing formulas are commercially available. Others are readily made from commerically available compounds by reactions known in the art.

In some embodiments of the process of this invention the growth effect material comprises only one of the compounds of the structural formula I. In other embodiments it comprises two or more such compounds.

The minimum quantity of growth effect material applied in the practice of the process is that quantity at which a substantial increase in crop yield is obtained. When the growth effect material comprises one or more compounds of structural formulas I-IV toxic to the plants of the crop to be effected, the maximum quantity of growth effect material applied in the practice of the process is that quantity at which substantial injury or kill of such plants commences. In general, satisfactory results are obtained when the growth effect material is applied at a rate in a range from about 1 ounce to about 5 pounds per acre and preferably in a range from about 2 ounces to about 2 pounds per acre.

The growth effect material is applied to plants on a pre-emergence basis, on a post-emergence basis or on both a pre-emergence and post-emergence basis. While it can be applied by itself, generally it is more practical to apply the growth effect material by means of a formulated composition.

The composition of this invention involves a formulated composition comprising growth effect material (defined above) at an effective concentration, and application aid material. Application aid material is generally inert to the growth effect material and its purpose generally is to aid the application of the growth effect material to the crop plants to be effected. The composition of the application aid material depends to a large extent on the way in which the growth effect material is to be applied to the plants to be affected, and on whether the formulated composition is to be normally solid or liquid.

When the formulated composition of this invention is normally solid, the application aid material generally comprises an inert solid in a divided condition.

Some embodiments of the solid composition are granular, while others are dispersible powders or dusts.

The granular compositions are of the coated type, the impregnated type or the incorporated type.

The coated type of granular composition is made by dusting a wettable powder or ground powder comprising the growth effect material onto granular carrier material which either before or after the dusting has been admixed with a sticker. Water, oils, alcohols, glycols, aqueous gums, waxes and the like, including mixtures thereof, are used as stickers. Examples of granular carrier material include attaclay, corn cobs, vermiculite, walnut hulls and almost any granular mineral or organic material screened to the desired particle size. Generally the growth effect material is about 2–20% by weight of the granular composition, the sticker is generally about 5–40% by weight of the composition and the granular carrier material is generally about 60–93% by weight of the composition.

To make the impregnated type of granular composition, the growth effect material is dissolved in a solvent, or melted, and then sprayed on or poured into the granular carrier material. The solvent can be removed by evaporation, or permitted to remain. In either case, the growth effect material impregnates the particles of the granular carrier material. Examples of the granular carrier material include those just mentioned with respect to the coated type of granular composition. The growth effect material is generally about 2–20% by weight of the composition, while the granular carrier material is generally about 80–98% by weight of the composition.

The incorporated type of granular composition is made by admixing the growth effect material with an inert finely divided solid such as, for example, clay, carbon, plaster of paris and the like, and formed into an mud with water or other inert evaporable liquid. The mud is dried to a solid sheet or cake, broken up or comminuted, and screened to the desired particle size (generally from 15–30 to 30–60 mesh, U.S. screen size). In other embodiments, the mud is put into a granular pan and granules are formed therein with subsequent removal of the water or solvent. In still another procedure, the mud is extruded through a die into rods which are cut into small pieces. In the incorporated type of granular composition, the growth effect material generally is about 2–50% by weight of the composition, and the solid carrier material is about 50–98% by weight of the composition.

In all granular embodiments of the formulated composition of this invention, various additives in minor concentrations relative to the carrier material also can be present.

In the other embodiments of the solid formulated composition of this invention, the application aid material usually comprises one or more dispersible inert solids. A typical dispersible solid of this type is clay. Other suitable solids (dispersible solid) include talc, attapulgite, pyrophylite, montmorillonite, Fullers earth, sawdust and the like. These embodiments can be air dispersible, in which case they can be applied as dusts. They can be water dispersible and in such case they are usually referred to as wettable powders. Generally, when it is intended that the composition be water dispersible, the composition preferably contains surfactant material (one or more surfactants) at a concentration sufficient to enable a suspension of the desired degree of stability to be formed when the composition is admixed with a suitable quantity of water. A typical dispersible solid composition of this invention generally comprises about 25–80% by weight of growth effect material, about 20–75% by weight of dispersible solid material and, when surfactant material is present, about 1–10% by weight of surfactant material. When the wettable powder embodiments are admixed with water to form suspensions, the water concentrations are such that the growth effect material concentration is about 1–10% by weight of the suspension.

Other specific embodiments of the formulated composition of this invention comprise solutions of growth effect material in inert, preferably volatile, usually water immiscible solvents for the growth effect material. Examples of suitable solvents include isophorone, cyclohexanone, methyl isobutyl ketone, xylene, kerosene, and the like. Such a solution, which can be regarded as a concentrate, typically comprises about 10–95% by weight of growth effect material and about 5–90% by weight of solvent. The solution can be applied as is, or diluted with more solvent, or dispersed in water, or water dispersed in it. Preferably, when it is intended that the solution be dispersed in water or water dispersed in it, the mixture of solution and water also comprises emulsifying material (one or more surfactants) at a concentration sufficient to enable an emulsion of the desired degree of stability to be formed. A typical emulsifying material concentration is about 1–10% by weight of the concentrate. The water concentration is such that the growth effect material concentration is about 0.1–50% by weight of the total composition.

Examples of the surfactants employed in both the liquid and solid compositions of this invention comprise the well-known surface active agents of the anionic, cationic or non-ionic types. They include alkali metal (sodium or potassium) oleates and similar soaps, amine salts of long chain fatty acids (oleates), sulfonated animal and vegetable oils (fish oils and castor oil), sulfonated acyclic hydrocarbons, sodium salts of lignin sulfonic acids, alkylnaphthalene sodium sulfonates, sodium lauryl sulfonate, disodium monolaurylphosphates, sorbitol laurate, pentaerythrityl monostearate, glyceryl monostearate, polyethylene oxides, ethylene oxide condensates of stearic acid, stearyl alcohol, stearyl amine, rosin amines, dehydroabietyl amine and the like, lauryl amine salts, dehydroabietyl amine salts, lauryl pyridinium bromide, stearyl trimethylammonium bromide, and cetyl dimethylbenzylammonium chloride. Others are listed in "Detergents and Emulsifiers 1968 Annual" by John W. McCutchens.

In addition to the growth effect material and application aid material, specific embodiments of the formulated composition of this invention comprise one or more other components such as, for example, plant nutrients, pesticides such as herbicides, insecticides, acaricides, fungicides and the like, drift control agents, and the like.

The compositions of this invention are used by applying them by conventional ways and means to the soil and to foliage of the plants to be affected. Generally, the compositions are applied pre-emergence, post-emergence or both at rates of 1 ounce – 5 pounds of growth effect material per acre. Higher and lower effective rates, however, are within the broader concepts of this invention.

The best mode now contemplated of carrying out this invention is illustrated by the following working examples of various aspects of this invention, including specific embodiments. This invention is not limited to these specific embodiments. In these examples all percentages are by weight unless otherwise indicated, all parts by weight are indicated by $w$, all parts by volume are indicated by $v$, and each part by weight ($w$) bears

EXAMPLE 1

This example illustrates how to make N-(2,6-dichlorobenzylidene)-α,α-dimethylbenzylamine.

To dry benzene (3200 v) are added α,α-dimethylbenzylamine (310 w) and 2,6-dichlorobenzaldehyde (400 w). The resulting solution is refluxed and water collected in a trap in the reflux return. After no more water is formed (6 v in 6 hours), the reaction mixture thus obtained is cooled, washed with water and dried over sodium sulfate. The benzene is stripped from the reaction mixture at reduced pressure up to 90°C. at 20 millimeters of mercury pressure. The residue (647 w), the desired product, is typically a viscous yellow liquid analyzing 4.8% N (calculated: 4.79%N), and its IR curve typically shows to aldehyde or amine bands, but does show the 6.1μ C=N band. It consists essentially of N-(2,6-dichlorobenzylidene)-α,α-dimethylbenzylamine.

By following the foregoing procedure and employing substantially the same mole ratio of amine to aldehyde, each of the other compounds of formula I are made from the corresponding amines and aldehydes with similar results.

EXAMPLE 2

This example illustrates a specific embodiment of a formulated composition of this invention.

This embodiment, an emulsifiable concentrate, has the following formulation:

| Components | Concentration |
|---|---|
| Growth effect material | 2 w |
| Acetone | 26 v |
| Polyoxyethylene (20) sorbitol monolaurate (Tween 20) | 1.3 v |

The growth effect material consists essentially of, for example, the Example 1 product. In other embodiments it consists essentially of other compounds of this invention or mixtures of compounds of this invention.

Polyoxyethylene (20) sorbitol monolaurate is a commercially available emulsifier in which the oxyethylene content averages about 20 mole percent.

The emulsifiable concentrate of the foregoing formulation is made by admixing the components at 20°-25°C. The result is a solution.

To use the emulsifiable concentrate, it is admixed with water to give an emulsion containing the growth effect material at a concentration in the range from about 0.1 to about 50% by weight of the emulsion, and the emulsion is applied by spraying it over the area to be treated.

EXAMPLE 3

This example illustrates another specific embodiment of a formulated composition in which the compounds of this invention are used.

This embodiment, a wettable powder, has this formulation:

| Components | Concentration (%) |
|---|---|
| Growth effect material | 50 |
| Clay (Hysil 233) | 45 |
| Sodium lignin sulfonate (Polyfon H) | 3 |
| Sodium isopropyl naphthalene sulfonate (vatsol OS) | 2 |

The growth effect material consists essentially of, for example, the Example 1 product. In other embodiments it consists essentially of other compounds of this invention or mixtures of such compounds.

The composition of the foregoing formulation is made by admixing the components at 20°-25°C.

To use the wettable powder composition, it is suspended in a quantity of water selected to provide a concentration of the growth effect material in the suspension in the range from about 1 to about 10% by weight of the suspension, and the suspension is applied by spraying it over the area to be treated.

The compositions of Examples 2 and 3 with the Example 1 product result in increased yields when applied to the foliage of growing soybeans, tomatoes, sugar cane and sugar beets at rates such that the Example 1 product is applied in the range from about 4 to about 16 ounces per acre.

Other features, advantages and specific embodiments of this invention will be readily apparent to those exercising ordinary skill in the art after reading the foregoing disclosures. Such specific embodiments are within the scope of the claimed subject matter unless expressly indicated otherwise. Moreover, while specific embodiments of this invention have been described in considerable detail, variations and modifications of them can be effected without departing from the spirit and scope of the invention as disclosed and claimed.

The terminology "consisting essentially of" as used in the specification (disclosure and claims) excludes any unrecited substance at a concentration sufficient to substantially adversely affect the essential properties and characteristics of the composition being defined, while permitting the presence of one or more unrecited substances at concentrations insufficient to substantially adversely affect said essential properties and characteristics.

I claim:

1. A process for increasing the yield of a crop, which comprises applying to the growing plants of said crop an effective quantity of material selected from the group of compounds represented by the generic structural formula:

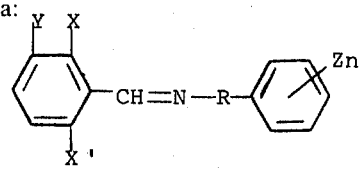

in which R is selected from the group consisting of $CH_2$, $CH(CH_3)$, $C(CH_3)_2$, and $CH_2-CH_2$, Z is selected from the group consisting of X'' and $CH_3$, n is selected from the group consisting of 0, 1 and 2, X, X' and X'' are selected from the group consisting of F, Cl, Br and I, and Y is selected from the group consisting of H and $NO_2$.

2. A method according to claim 1 in which said material consists essentially of a compound according to the formula in which both X and X' are Cl.

3. A method according to claim 2 in which R is $C(CH_3)_2$, $n=0$ and Y is H.

* * * * *